April 7, 1925. 1,532,964
C. VALGUARNERA
MEANS FOR RADIOSIGNALING SHIPS DURING A FOG
Filed Aug. 9, 1924 2 Sheets-Sheet 1
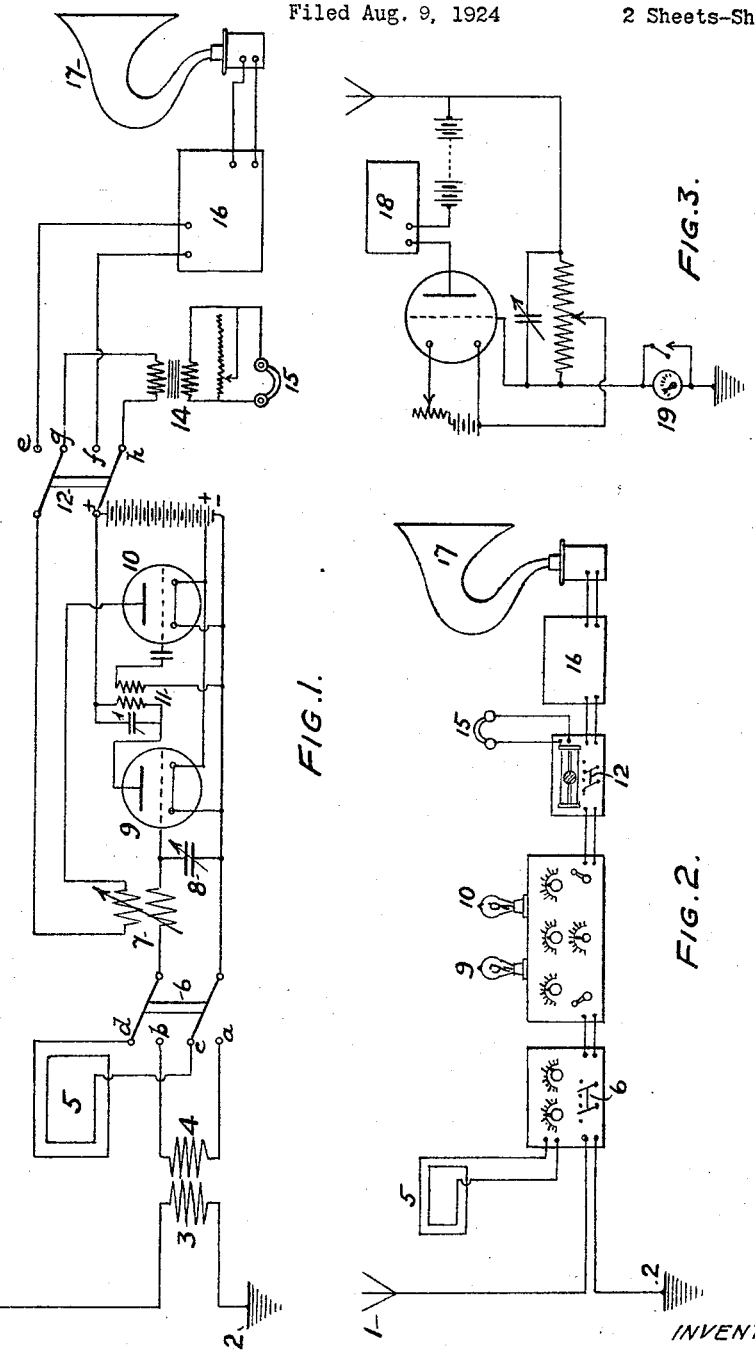
WITNESS:
INVENTOR
Corrado Valguarnera
BY
Busser and Harding
ATTORNEYS.

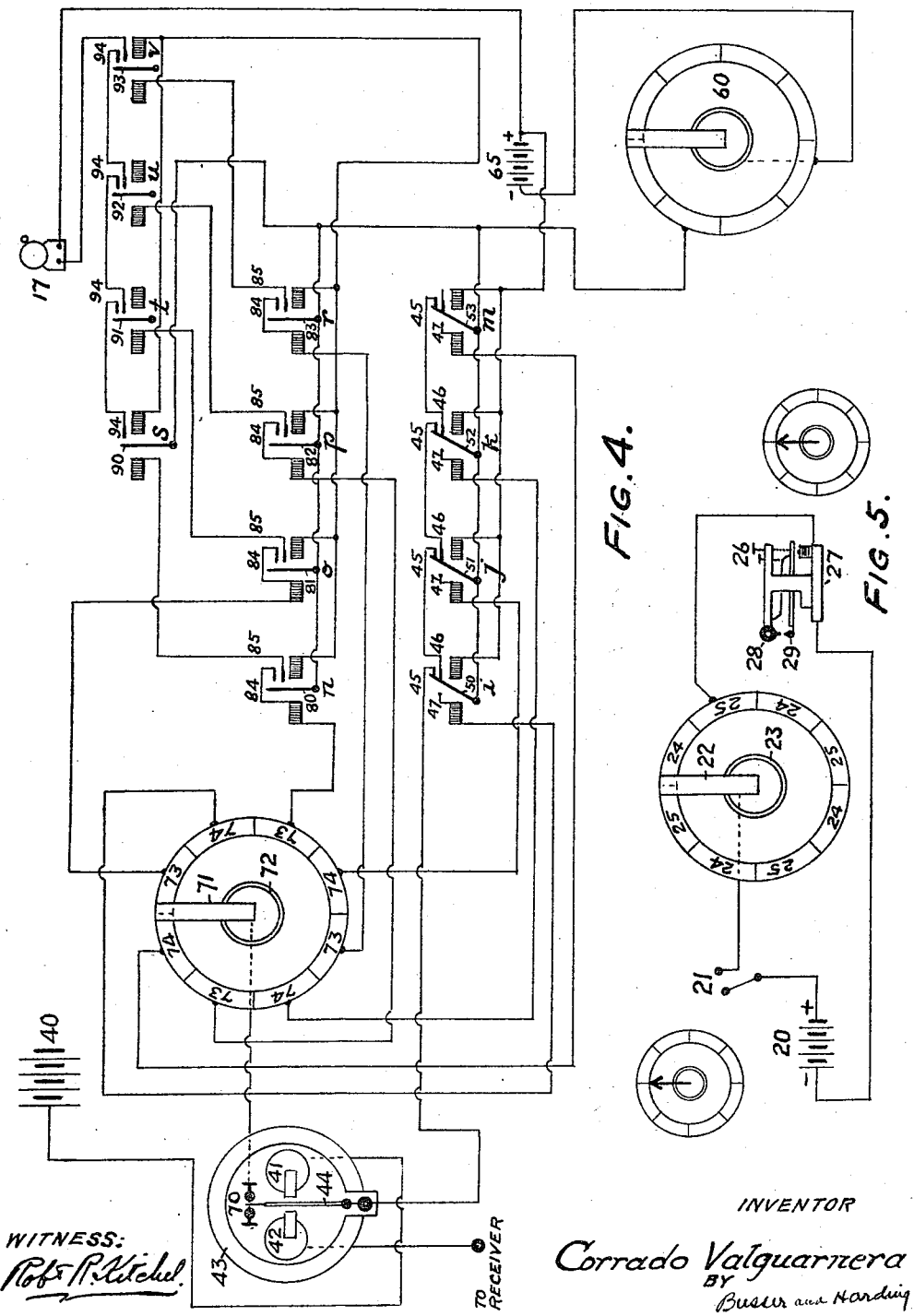

Patented Apr. 7, 1925.

1,532,964

UNITED STATES PATENT OFFICE.

CORRADO VALGUARNERA, OF PALERMO, ITALY.

MEANS FOR RADIOSIGNALING SHIPS DURING A FOG.

Application filed August 9, 1924. Serial No. 731,019.

*To all whom it may concern:*

Be it known that I, CORRADO VALGUARNERA, a subject of the King of Italy, residing at Palermo, Italy, have invented a new and useful Improvement in Means for Radiosignaling Ships During a Fog, of which the following is a full, clear, and exact description, reference being had to the accompanying drawings, which form a part of this specification.

It is well known that waves, either of sound or light, are absorbed by fog, so that acoustic or luminous signals are generally inadequate and sometimes even dangerous, for ships, during foggy weather.

The object of the present invention is to remove this inconvenience by using, when signaling, electro-magnetic waves not influenced by fog and already used with success in signaling.

This system consists of two couples of standardized radio-signaling stations of which the transmitter has a limited range of intensity, while the receiver is provided with a radio-goniometric antenna and a potentiometer inserted on the telephonic circuit to reduce or increase the receiving sensibility of the apparatus.

If two ships, both provided with this apparatus, are proceeding in a fog, they can exchange signals only when they enter inside their respective range of transmission power, and each will ascertain the other's position by using their radio-goniometric antennæ and will approximately determine the distance between them by decreasing or increasing—by means of the potentiometer—the range of reception of the receiving apparatus. In this way their presence in a determining zone of water, the degree of their proximity to one another, their course, the distance between them and their respective positions may be recorded. These advantages are not attained by any one of the existing signaling systems. In order to obtain a most reliable function of this system, the transmitting station is provided with an antenna and is calibrated to emit waves of a determined length, differing from those used by other transmitting stations.

The transmitting station is equipped with:

(*a*) A breakswitch, an automatic transmitter of signals, in order to do without the constant presence of an operator near the apparatus, and to insure standard signals;

(*b*) An amperemeter of the antenna tensions.

The receiving station is tuned to the wave length of the transmitting station and is provided with:

(*a*) An antenna standarized to the transmitter's antenna, for the functioning of the alarm relay;

(*b*) A syntony box;

(*c*) A special relay which makes it possible to use an automatic alarm;

(*d*) A radio-goniometric antenna fitted with a quadrant to facilitate the determination of the position of a transmitting station on board a ship;

(*e*) A potentiometer with a transforming reducer fitted with a slider and a scale graduated in kilometres, corresponding to the degree at which the intensity of the signaling will increase or decrease according to the proximity of the moving transmitting stations;

(*f*) A telephonic cap.

With this full equipment, the system has an absolutely autonomic function, the apparatus being standardized to a determined length of wave of a determined signal, while at the same time a special relay and a loud-speaking telephone (alarm) are used.

A preferred embodiment of the invention is shown in the accompanying drawings, in which—

Fig. 1 is a diagram of the receiving apparatus, comprising the alarm for indicating the presence of a vessel within a predetermined distance, and the means for registering and determining the direction and distance of the vessel.

Fig. 2 is a side view of the same apparatus.

Fig. 3 is a diagram of the transmission apparatus.

Fig. 4 is a diagram of the details of the special relay and selector included in the receiving apparatus of Fig. 1.

Fig. 5 is a diagram of the details of the automatic transmitter of the transmitting apparatus of Fig. 3.

1 is the receiving aerial grounded at 2. 3 is the primary jigger and 4 the secondary jigger. 5 is the radio-goniometric antenna. The circuit through the secondary jigger connects with contacts *a* and *b* so arranged in relation to other contacts c and d in the radio-goniometric circuit that by means of a switch 6, either the radio-goniometric antenna 5 or the receiving aerial 1 may be connected in circuit with the elements of the receiving station hereinafter described.

7 is a reaction spool, 8 a tuning condenser, 9 an amplifying valve, 10 a detector, 11 an intervalvular resonance transformer; all in circuits connected with a switch 12, which is movable to connect with either contacts e and f or contacts g and h.

Contacts e and f are in a circuit which includes a special relay 16 (shown in Fig. 4 in detail) and an alarm 17, which can be either an electric horn or an electric bell.

Contacts g and h are in a circuit which includes a reducing transformer 14 and a telephone cap 15.

Referring to Fig. 3: 18 is a special automatic transmitter (shown in detail in Fig. 5) and 19 an amperemeter.

Referring to Fig. 5: the automatic transmitter comprises a battery 20 whose positive pole is in the circuit with interrupter 21 which is in the circuit with brush 22, rotating by means of the clockwork gear 23 upon the series of contact sectors 24, 25, which are respectively in circuit with the automatic key 26 which effects—by means of gear 27—the opening and closing of the antenna circuit between the two electrodes 28, 29.

The special relay 16, as shown in Fig. 4, comprises the following elements and circuits: The battery 40 is in circuit with spool 41 of relay 43. Spool 42 of relay 43 is in circuit with the radio-telegraphic apparatus (receiver). The movable antenna 44 is in circuit, by means of contacts 45, 46, the movable antennæ 50, 51, 52, 53 of the relays i, j, k, m, and the automatic interrupter 60, with the negative pole of the battery 65.

When a radio-telegraphic signal is received by relay 43, the movable antenna 44 will touch contact 70, which is in circuit with brush 71 rotating, by means of a clockwork gear 72, upon the series of contact sectors 73, 74. The contact sectors 73, corresponding to the contact sectors 24 of the transmitter, are in circuit with the negative spools of relays n, o, p, r. The contact sectors 74 are in circuit with the negative spools of relays i, j, k, m. Relays n, o, p, r have their positive poles in circuit with the positive pole of battery 65. The movable antennæ 80, 81, 82, 83 of relays n, o, p, r are in circuit with the negative pole of battery 65.

Whenever brush 71, being in circuit with the negative pole of battery 65, touches contact sectors 73, the movable antennæ 80, 81, 82, 83, being attracted, will, through connections 84, insert themselves in the circuits of the negative spools of relays o, p, r, and at the same time, through connections 85, will insert themselves in circuit with the negative spools of relays s, t, u, v.

In this way, the position of the movable antennæ 80, 81, 82, 83 of the relays n, o, p, r will be made firm, because the antennæ themselves will establish closed circuits including the negative spools of the relays, while the movable antennæ 90, 91, 92, 93 of the relays s, t, u, v, in circuit with the negative pole of battery 65, will close successively the contacts 94, thus operating the alarm 17.

When, however, the brush 71 touches the contact sectors 74 in circuit with the negative spools of relays i, j, k, m, whose positive poles are in circuit with the positive pole of battery 65, the result will be to attract the antennæ 50, 51, 52, 53 of said relays upon contacts 45, 46; the circuit which, through contacts 45, 46 and antennæ 50, 51, 52, 53, was closed in movable antennæ 44, will be interrupted; and the position of antennæ 50, 51, 52, 53 will be made firm by contact 47, thereby inserting the negative spools of relays i, j, k, m in circuit with antennæ 50, 51, 52, 53. In this case, antenna 44 is excluded from the circuit to the negative pole of battery 65, and the result will be that relays n, o, p, r will be unable to work.

It is clear that when the series of relays n, o, p, r are not in action, the alarm will be excluded from the circuit through the negative pole of battery 65 and therefore will not operate.

The general functioning of the transmitting system and relays is based on the synchronous accord of the emitted and received signals.

Brush 22 of the transmitter as well as brush 71 of the receiver are synchronically displaced by means of clockwork gears 23, 72.

After their reception, transmitted signals are turned into openers and closers of circuits by relay 43, which is in circuit with brush 71. The result will be that brush 71 will close the circuit on contacts 73 only when relay 43 will collect a signal corresponding in its length, number and progression to the one emitted by the transmitter.

Now the movement of both brushes being synchronous in the transmitter as well as in the receiver, and their rotating movement being regulated by two clockwork hands, the result will be that the operation of relays n, o, p, r and of alarm 17 will take place only when brush 71 in circuit with relay 43 will touch contacts 73 corresponding in number, as well as in position, to the contacts 24 of the transmitter.

In the case of reception of outer (parasitary static, etc.) signals, what will happen is as follows: such signals not corresponding to the number and position of brush 71 on contacts 73, brush 71 will close the contacts 74, bringing about, by means of relays $i$, $j$, $k$, $m$ the exclusion from the circuit (through the negative pole of battery 65, contacts 45, 46, movable antenna 44, contact 70 and brush 71) of relays $n$, $o$, $p$, $r$ and hence of the alarm.

The automatic interrupter 60 excluding, at the very moment of the start of rotation of brushes 22 and 71, the whole system through the negative pole of battery 65, brings back the whole apparatus to the initial condition.

My invention is characterized by a number of features, new in combination, and a number of them new per se, the principal of which may be enumerated as follows:

(1) Transmitting stations with a valve having a range of transmission not superior to (say) 2 kilometres.

(2) A new type of automatic transmitter of signals so as to do away with the continuous attendance of an operator at the apparatus during its functioning.

(3) A receiving station with valve, tuned with the transmitting one by means of special antennæ.

(4) A new type of selector relay which can bring about the mechanical functioning of the alarm (electric horn or electric bell).

(5) A radio-goniometric antenna to determine the position of the transmitting station.

(6) A reducing transformer and a potentiometer, in order to determine approximately the distance between the stations whenever they move away from, or approach, each other.

Having now fully described invention, what I claim and desire to protect by Letters Patent is:

1. A radio-signaling system for ships, which comprises a transmitting station having a limited transmitting range, a determined wave length, an antenna tuned to that of the receiving station, and a special transmitter of automatic signaling having a standard signal; and a receiving station comprising an alarm, a double system of aerials, one for the functioning of the alarm, and the other for determining the ship's position; switch systems for tuning the antenna with the circuits; a telephone with reducing transformer and potentiometer to vary the sensitiveness of the receiving apparatus; and synchronized coacting relay and signal selector for actuating the alarm when predetermined signals are received.

2. A radio-signaling apparatus for use by ships in foggy weather comprising the combination with synchronized coacting transmitting and receiving devices, of two aerials, one of which is a radio-goniometric aerial, a switch for alternatively connecting in said aerials, an alarm, a potentiometer and telephone, and a switch for alternatively connecting in said alarm and said potentiometer and telephone, whereby signals transmitted by the sending ship may first be heard by loud audible signals, after which the distance and position can be estimated by the use of the radio-goniometric aerial in conjunction with the potentiometer and telephone.

In testimony of which invention, I have hereunto set my hand, at Philadelphia, Pennsylvania, on this 30th day of July, 1924.

CORRADO VALGUARNERA.